2,684,927

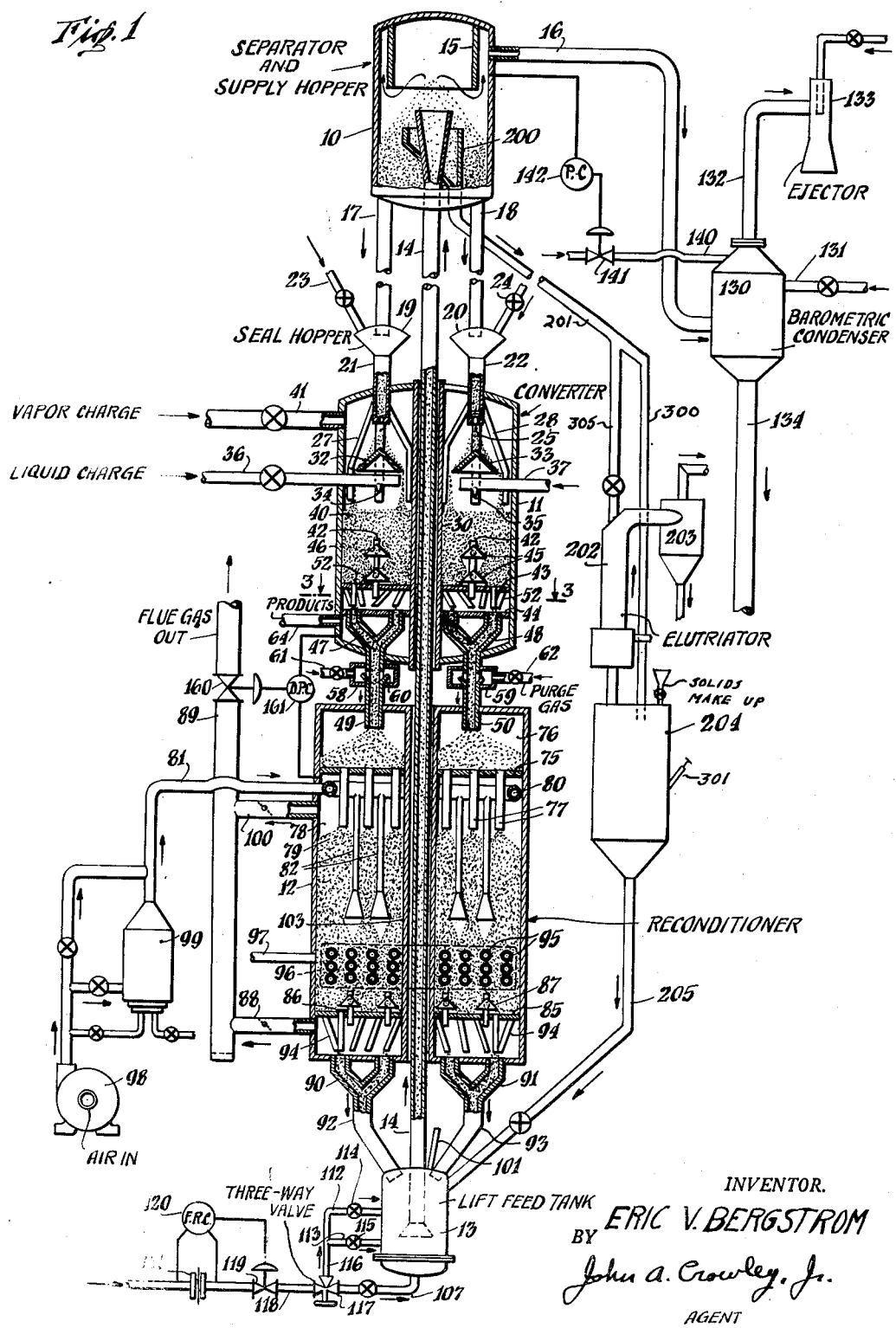

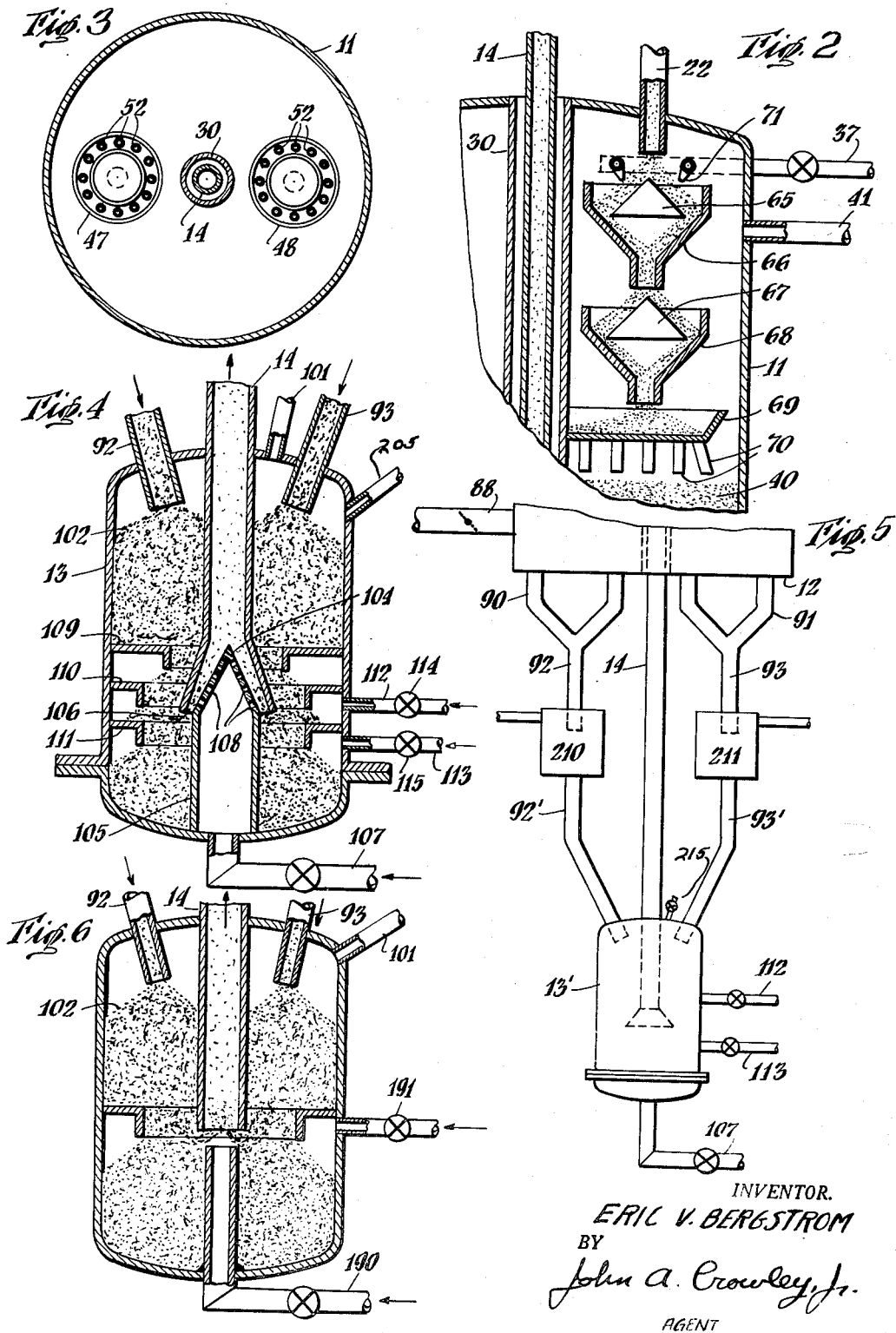
July 27, 1954 — E. V. BERGSTROM — 2,684,927
PROCESS AND APPARATUS FOR HYDROCARBON CONVERSION
Filed Feb. 10, 1949 — 2 Sheets-Sheet 2
INVENTOR.
ERIC V. BERGSTROM
BY John A. Crowley, Jr.
AGENT Patented July 27, 1954

UNITED STATES PATENT OFFICE 2,684,927

PROCESS AND APPARATUS FOR HYDROCARBON CONVERSION

Eric V. Bergstrom, Short Hills, N. J., assignor to Socony-Vacuum Oil Company, Incorporated, a corporation of New York Application February 10, 1949, Serial No. 75,642

15 Claims. (Cl. 196—52)

This invention pertains to processes for conversion of fluid hydrocarbons in the presence of a granular contact material which may or may not be catalytic in nature. Typical of the processes to which this invention pertains are the catalytic cracking conversion, isomerization, hydrogenation, reforming, dehydrogenation aromatization, hydroforming, treating and desulfurization of petroleum fractions. Also typical are the coking, viscosity reducing of petroleum residua and high temperature pyrolytic conversion processes such as the conversion of propane and ethane to ethylene or of methane to acetylene. In these latter processes the granular contact material serves merely as a heat carrying material.

An important commercial unit for continuously conducting reactions of this type is one wherein the granular contact material is passed cyclically through a hydrocarbon conversion and a contact material reconditioning zones in which it flows downwardly as a substantially compact column. The contact material employed in such a process may be a catalyst in the form of natural and treated clays, beauxites, inert carriers impregnated with certain catalyst active metallic oxides or synthetic associations of silica, alumina, magnesia or of combinations thereof to which may be added small amounts of metallic oxides for specific purposes. When the contact material is employed for heat carrying purposes only it may take the form of metal balls, capsules containing fusible alloys, pebbles, Carborundum, mullite, zirconium oxide, fused alumina and the like. For coking processes the solid material may consist of a low activity clay catalyst, petroleum coke or porous inert material such as pumice. The contact material may be in the form of pellets, spheres, tablets or irregular shaped particles and it should be understood that the term "granular" is employed broadly herein as covering any of the above. The contact material granules may range in size from about one-half inch to 80 mesh Tyler, and preferably should be of the order of 4 to 20 mesh size.

This invention is concerned with an improved system for conducting reactions of the type discussed above in the presence of a cyclically moving granular contact material and particularly with the contact material circulation part of such system.

Heretofore, it has been customary in commerical installations to position the reaction and regeneration vessels side by side and to circulate contact material between the vessels in bucket elevators. Such elevators are unsatisfactory for extremely high temperature operations due to mechanical failure and also impose undesirable practical limitations on the maximum rate of contact material circulation. It has been proposed in the prior art to withdraw contact material from one of the contacting vessels through a throttled outlet pipe and then suspend it in a stream of gas maintained under pressure by which it is lifted to the other contacting zone. The lift gas in such proposed systems is provided by a compressor and due to the very substantial pressure drop across the lift pipe, the power requirements for such lift systems is very high. Also, since there is a substantial pressure at the lower end of the lift stream, a serious problem arises in attempting to introduce the contact material into the lift gas stream, particularly when the contacting zone from which it passes to the lift stream is operating at a lower pressure than the lift gas stream.

It is a major object of this invention to provide an improved method and apparatus for conducting hydrocarbon conversions in the presence of moving granular contact material.

A specific object is the provision in such a process of a new and improved method and apparatus for accomplishing the contact material circulation. Another specific object is the provision in a hydrocarbon conversion system wherein a granular contact material is cyclically circulated through conversion and reconditioning zones of method for pneumatically transferring the contact material from one of said zones to a separation zone above the other zone without the use of pressure and while avoiding discharge of seal and lift gases from the separation zone directly into the atmosphere.

These and other objects of this invention will become apparent in the following discussion.

According to one form of this invention, contact material is passed downwardly in series through two contacting zones, one of said zones being the hydrocarbon conversion zone and the other zone being the contact material reconditioning zone. The contact material is passed downwardly by gravity flow from the lower contacting zone to a point where it enters a stream of lift gas. The lift gas and contact material are sucked upwardly to a separation zone located above the upper contacting zone, which separation zone is maintained under a vacuum sufficient to accomplish the lifting. Separated lift gas is evacuated from the separation zone so as to maintain the vacuum therein, while the contact material flows from the separation zone to the upper contacting zone through a gravity feed leg of sufficient height to overcome the pressure differential between these two zones. According to the preferred form of the invention, the lift gas is condensible, for example steam, and is passed from the separation zone to a barometric condenser wherein it is condensed so as to draw the vacuum.

The invention may be most readily understood by reference to the attached drawings of which:

Figure 1 is an elevational view, partially in section, showing a preferred arrangement of the entire cyclic conversion system according to this invention;

Figure 2 is an elevational view, partially in section showing a modification of a portion of the conversion vessel in Figure 1;

Figure 3 is a sectional view taken along line 2—2 of Figure 1;

Figure 4 is an elevational view, partially in section showing details of the lift feed tank shown in Figure 1;

Figure 5 is an elevational view showing a modification of part of the arrangement shown in Figure 1; and Figure 6 is a similar view of a modified form of the lift feed tank. All of these drawings are highly diagrammatic in form.

Turning now to Figure 1, we find a supply hopper or separator 10, a converter 11, a reconditioner 12 and a lift feed tank 13 arranged in vertical series. The separator may be of any desired conventional design, the one shown being of the settling chamber type in which gas and contact material enter upwardly from the flared open end of the lift conduit 14 located intermediate the top and bottom of chamber 10. A cylindrical baffle 15 is suspended from the top of chamber 10 and terminates near the level of gas discharge from the lift conduit. A gas outlet conduit 16 connects through the side of chamber 10 near its top and communicates the upper section of chamber 10 with a barometric condenser 130. Condensing water is supplied to condenser 130 via conduit 131 and non-condensed gas is withdrawn via conduit 132 to an ejector 133. A barometric leg 134 extends downwardly from the condenser to a suitable well not shown. The barometric condenser may be of conventional construction. Two vertical feed leg pipes 17 and 18 extend down from the bottom of chamber 10 to terminate within the upper section of seal hoppers 19 and 20. The feed leg pipes are continued as pipes 21 and 22 down from the bottom of the seal hoppers into the upper section of the convertor 11. Seal gas inlets 23 and 24 connect into the tops of seal hoppers 19 and 20 respectively. The pipes 21 and 22 are closed on their lower ends except for centrally positioned orifices 25 which are of such size as will permit the passage therethrough of only a portion of the total contact material flow circulation. A number of branch pipes 27 and 28 extend down from the pipes 21 and 22 to a plurality of points uniformly distributed across the cross-section of vessel 11. While only two gravity feed legs are shown it will be understood that any desired number may be employed, for example, four pipes, one in each quadrant may be provided for better contact material distribution.

The convertor 11 shown is circular in horizontal cross-section but may be of any desired shape. A vertical conduit 30 extends centrally through the convertor 11 and its open ends are welded to the top and bottom of the convertor so as to provide a central vertical shaft which extends through the convertor. Within the upper section of the convertor distributing cones are supported by suitable means (not shown) centrally below the pipes 21 and 22 respectively. Spray nozzles 34 and 35 are positioned below the cones 32 and 33 and are mounted on liquid supply pipes 36 and 37 respectively. The spray nozzles are located above the lower ends of pipes 27 and 28 so that the liquid oil charge is sprayed into the shower of contact material falling from the cones 32 and 33 above the surface of the compact bed of contact material 40. A conduit 41 connects into the upper section of vessel 11 for vapor charge.

It will be understood that other suitable arrangements may be provided for contact material and hydrocarbon introduction into the convertor. A modified arrangement is shown in Figure 2 in which like elements bear the same numerals. In the arrangement shown in Figure 2 the pipes 21 and 22 are entirely open on their lower ends, only pipe 22 being shown. Pipe 22 delivers the contact material on cone 65 from which it flows into a funnel 66. The contact material flows then over cone 67 into funnel 68 and finally into pan 69 from which it flows via pipes 70 onto the bed surface. Liquid charge is sprayed from nozzles 71 onto the stream of contact material flowing on the cone 65. In this system the contact material flow is entirely as a compact stream. Such an arrangement is described in detail in United States Patent 2,438,261, issued March 23, 1948.

Across the lower section of vessel 11 there are provided two vertically spaced apart horizontal partitions 43 and 44. A plurality of riser pipes 42 (two being shown) extend up through the upper partition 43. The pipes 42 are uniformly distributed around the partition and are closed only on their upper ends. On each pipe 42 there are attached vertically spaced, inverted, conical shaped collecting cups 45. The undersides of the cups 45 communicate with the interior of pipes 42 through orifices 46. Depending from the lower partition 44 are two annular shaped funnels 47 and 48 which have downspouts 49 and 50 respectively depending from their bottoms. A plan view of these funnels may be seen in Figure 3. A plurality of pipes 52 depend from partition 43 and terminate at a common level just above the annular funnels. The pipes 52 are uniformly distributed across the horizontal cross-sectional area of partition 43 and half of these pipes deliver contact material into funnel 47 while the other half deliver into funnel 48. This arrangement insures uniform flow of contact material through all the pipes 52 since the flow is as a compact stream throttled at a still lower level in the system as will be described hereinafter. The downspouts 49 and 50 deliver the contact material into the upper end of the reconditioner 12. If desired, four sets of funnels and downspouts may be provided instead of two in which case each set is preferably offset 90 degrees from any other set. Purge gas inlet manifold boxes 58 and 59 are provided around the downspouts 49 and 50 and louvers 60 are provided in the downspouts to permit ingress of purge gas. Supply pipes 61 and 62 connect into the manifold boxes 58 and 59 respectively. A vapor outlet conduit 64 connects into the convertor at a level between partitions 43 and 44. Other catalyst withdrawal and purging arrangements may be substituted for the one described. For example, an alternative arrangement which may be employed is described in United States Patent 2,434,202, issued January 6, 1948. When the entire oil charge is in the gaseous phase the reactant flow through the contact material may be upward instead of downward. It will be readily understood by those acquainted with the art that the convertor design may be modified considerably from that described herein in ways which are well known without departing from the scope of the present invention.

In the upper section of reconditioner 12 there is provided a horizontal partition 75 which provides a supply chamber 76. A plurality of uniformly distributed pipes 77 depend from partition 75 for contact material flow from the supply chamber and to provide a gas space 78 above the column 79 in the reconditioner. A ring type gas inlet header 80 supplied from conduit 81 is provided in the gas space 78. Tubes 82 depend from the header 80 and terminate in flared lower ends at an intermediate level in the vessel 12. A partition 85 extends across the lower section of vessel 12 and riser pipes 86 similar to pipes 42 in the convertor extend upwardly from the space under partition 85 to a level thereabove. Inverted collector cups 87 are provided on pipes 86. A gas outlet conduit 88 communicates the space under partition 85 with a stack 89. Another gas outlet conduit 100 connects between the space under partition 75 and stack 89. Annular shaped funnels 90 and 91 with downspouts 92 and 93 respectively depend from the bottom of vessel 12 and are supplied with solid material from pipes 94 which depend from partition 85. The arrangement is similar to the contact material withdrawal arrangement provided in the convertor 11 as described above. Heat transfer tubes 95 are provided at one level along the lower portion of the reconditioner. A suitable heat exchange fluid is supplied to these tubes from a manifold box on one side of the vessel and withdrawn into a second manifold box on the opposite side of the vessel. The inlet manifold box is indicated at 96 and is supplied in turn from inlet conduit 97. Reconditioning gas, for example air, passes from a blower 98 through a suitable line heater 99 and then via conduit 81 to the ring type manifold 80. If desired, the line heater 99 may be bypassed in some operation. It should be understood that the reconditioner described above is only one of a number of possible designs which are particularly adapted for use in operations wherein a catalyst bearing carbonaceous deposits requires regeneration by burning of the deposits. In operations where the purpose of the reconditioner is merely to exchange heat to or from the contact material, its construction may vary considerably from that shown in Figure 1 depending on the particular requirements of the operation involved.

The downspouts 92 and 93 deliver contact material into the upper section of the lift feed tank 13 which is vented either to the atmosphere or to a low pressure zone via pipe 101. If desired, depressuring chambers may be provided along the pipes 92 and 93 above the feed tank instead of venting the feed tank. Such an arrangement is shown in Figure 5 in which the pipes 92 and 93 terminate within depressuring chambers 210 and 211. Gas is withdrawn from the tops of these chambers and the contact material flows down through pipies 92' and 93' into the closed lift feed tank 13'.

The feed tank may be best understood by considering Figure 4 along with Figure 1. A vertical lift conduit extends upwardly from a location within the tank 13, below the bed surface 102 therein through the shafts 103 and 30 in the reconditioner and convertor and up into the separator 10 wherein it terminates at an intermediate level between its ends. The shafts 103 and 30 are of substantially greater diameter than the lift pipe 14 so as to avoid thermal expansion stresses and also so as to permit the substitution of a larger lift pipe should higher circulation rates be required at a future time. The lower end of pipe 14 is flared and the conical roof 104 of a cylindrical inlet header 105 extends centrally up into the flared end of pipe 14 so as to leave an annular passage 106 for contact material entry. The header 105 is connected to the bottom of tank 13 and gas is supplied thereinto through pipe 107. Perforations 108 are provided in roof member 104 to permit gas flow into pipe 14. The perforations should preferably be positioned above the level of contact material entry into the lower end of pipe 14 and should be of sufficient number and size to limit the linear rate of gas flow passing therethrough to the same order of magnitude as the rate of mixed gas flow in the pipe 14 above its flared lower end. Ring shaped angle members 109, 110 and 111 are provided at three levels around the inner periphery of tank 13. Member 109 serves to baffle the contact material flow while members 110 and 111 serve as gas distributors supplied from conduits 112 and 113 respectively. The gas distributor members should be at levels near that of the lower end of pipe 14. Flow control valves 114 and 115 are provided on conduits 112 and 113 respectively and these conduits are connected through conduit 116 to one side of a three-way valve 117. Conduit 107 communicates header 105 with another side of valve 117 and gas is supplied to the third side of valve 117 through conduit 118. A diaphragm operated flow control valve 119 is provided on conduit 118 upstream from valve 117. Valve 119 is actuated by flow rate controller 120 in response to changes in gas flow rate as measured by orifice 121.

In operation, contact material passes downwardly as a substantially compact column through feed legs 17 and 18 to the seal zones 19 and 20 and thence into the converter 11. The gravity feed legs are long enough to create a head of contact material at their lower ends greater than the pressure differential between the converter and the supply hopper 10. Steam or flue gas or some other suitable seal gas is admitted into the seal zones so as to maintain an inert gaseous blanket adjacent the lower ends of the feed legs. A portion of the contact material passes through orifices 25 onto cones 32 and 33 and then downwardly as a shower onto the surface of column 40. If a liquid charge is being employed it may be sprayed from nozzles 34 and 35 into the shower of contact material. Gasiform charge enters via conduit 41. The remainder of the contact material flows as compact streams through pipes 27 and 28 onto the surface of column 40 and thereby maintain constant the column surface level. In other arrangements such as that shown in Figure 2, the entire contact material feed may be conducted from hopper 10 to column 40 as a compact stream or streams. The fluid reactant is converted to gasiform products which are collected by collectors 45 and withdrawn from the vessel via conduit 64. Used contact material passes as a compact stream or streams from vessel 11 to vessel 12, and then passes through vessel 12 as a compact column of gravitating granules. An inert purge gas is supplied into the pipes 49 and 50 to strip gasiform hydrocarbons from the contact material and to prevent flow of reactant gas between vessels 11 and 12. The purge steam may be withdrawn via conduit 64 along with the gasiform products. A suitable reconditioning gas enters the vessel 12 via conduit 81, header 80 and pipes 82 and then flows in part up through the column 79 to outlet 100 and in part down through column 79 to outlet 88. The reconditioning gas may be merely a heating or cooling gas in the case of prolytic processes while it may be an oxygen containing gas suitable for burning carbonaceous deposits from the contact material in the case of most catalytic processes. Additional heat may be added to or removed from column 79 by means of heat transfer tubes 95. Reconditioned contact material flows by gravity as compact streams into the feed tank 13 wherein it is delivered onto the surface of the substantially compact bed 102. The tank 13 is vented so that the surface of the bed 102 is substantially at atmospheric pressure. Steam is admitted from conduit 118 through valve 117 and conduit 107 into the header 105 and thence it passes vertically directly into the lower end of pipe 14. The steam may be at a relatively low pressure, near atmospheric since it is sucked up through pipe 14 into the hopper 10 which is maintained under a substantial vacuum. A secondary stream of steam passes from the three-way valve 117 to pipes 112 and 113 and enters the bed from under distributor 110 or 111 or both and then passes transversely through the bed into the passage 106. This induces or pushes contact material into the vertical lift stream in pipe 14. The vertical lift stream imparts additional energy to the contact material and thereby accelerates it to the required carrying velocity. It has been found that the rate of contact material flow from the bed 102 into the lift pipe 14 can be controlled solely by regulating the rate of flow of the secondary steam stream. While it is preferred to pass the secondary stream transversely across the entire bed as shown in Figure 4, it has been found that operation according to this invention can still be accomplished as long as the secondary gas stream passes through at least part of the bed from a location other than directly below the lift pipe. Thus, in less preferred forms of the invention the secondary gas stream may be all supplied at the surface of the bed in the feed tank as via pipe 215 in Figure 5. In this event, the pressure in the feed tank is slightly above atmospheric.

A modified form of lift feed tank is shown in Figure 6. In this form the lift pipe 14 is not tapered on its lower end and the principal gas stream is supplied into tank 13 via conduit 190 which is in line with pipe 14 but which terminates a short distance therebelow so as to provide a vertical gap between pipes 14 and 190 into which contact material is induced by means of the secondary steam stream from pipe 191. The proper size of the gap depends upon the size of the pipes 14 and 107. Where pipe 14 was 10 inches in diameter and pipe 190 was 7 inches in diameter, a vertical gap of from 2 to 10 inches was found to provide satisfactory operation. In the modification of Figure 6, the contact material does not have to flow upwardly before entering the stream of lift gas as it does in the modification shown in Figure 4.

Turning again to Figure 1, the contact material is lifted through pipe 14 into the hopper 10 wherein it settles due to the lower gas velocity therein. The separated steam passes via conduit 16 to the barometic condenser 130 wherein it is condensed by contact with water, thereby drawing the vacuum on hopper 10. The water and condensed steam leave the condenser 130 via barometric leg 134. Since an atmosphere of steam is maintained within the lower section of the feed tank very little non-condensed gas enters the lift gas stream, but any non-condensible gas which is sucked into the system may be withdrawn from the barometric condenser by a small compressor or an ejector 133. The vacuum maintained within the hopper 10 should be great enough to accomplish the lifting of contact material through pipe 14 and to overcome the pressure drop through pipe 14. In general, the pressure drop across pipe 14 may be of the order of 3-12 pounds per square inch depending upon the rate of contact material flow, its density in the lift pipe and the length of the lift pipe. In order to provide proper control of the lift operation the vacuum in chamber 10 should be maintained constant. A convenient method for accomplishing this is to introduce a small amount of non-condensible gas via pipe 140 into the barometric condenser. The rate of gas flow in pipe 140 is controlled by valve 141 and pressure control instrument 142 to maintain constant the vacuum in hopper 10.

The contact material level is maintained constant in separator 10 by permitting a small portion of the circulation to overflow into funnel 200 from which it passes via pipes 201 and 300 into the top of an accumulator 204. The contact material maintains itself within a relatively narrow range of levels within the lower portion of the accumulator and these levels are measured by level indicator 301. A small amount of contact material attrition results from the continuous circulation to the cyclic system. Fine material may be removed from the system by passing a portion of the contact material via pipes 201 and 305 into an elutriator 202 wherein it is scrubbed clean of fines by an upwardly moving gas stream. The gas containing fines is passed to separator 203 wherein the fines are separated. The scrubbed granular material settles into the accumulator 204 from which it flows via pipe 205 to the lift feed tank 13.

In order to avoid excessive fluctuations in the operation of the barometric condenser and also in order to insure proper separation of contact material and gas in hopper 10, it is desirable to maintain constant the total rate of gas flow in pipe 14 irrespective of the rate of contact material circulation. Also, it has been found desirable to maintain the linear gas velocity in the lift pipe within a relatively narrow optimum rate range in order to accomplish the contact material transfer with a minimum of attrition loss. It has been found that this can be accomplished by controlling the total rate of steam flow substantially constant through control valve 119. The rate of contact material flow into the lift pipe is controlled by adjusting the rate of gas flow in pipes 112 or 113 or both, which are fed from pipe 116. Any adjustment in the rate of gas flow through pipe 116 is compensated for by a substantially equal and opposite adjustment in the rate of flow through pipe 107. This can be accomplished by means of the three-way valve 117 or by other suitable means. The specific method and apparatus for controlling the rate of contact material flow described herein is the subject of claims in my copending application Serial Number 76,017, filed in the United States Patent Office on February 12, 1949. The invention covered in the present application is not considered as being limited to this particular method of flow control or to the lift feeding method and device details described hereinabove.

According to the preferred form of this invention, it is desirable to position the reconditioner near ground level with the converter only a short distance thereabove, while the relatively small supply hopper is positioned a substantial distance above the convertor. This permits all of the large vessels to be located near ground level with a consequent saving in structural steel cost. It is desirable to maintain the pressure in the reconditioner not substantially above that in the convertor so that very little conact material leg height is required to effect gravity flow between the vessels. This may be accomplished by means of the diaphragm operated valve 160 on stack 89 and differential pressure controller 161. It will be noted that since the tank 13 is maintained near atmospheric pressure the pipes 92 and 93 may also be relatively short in length so that essentially all of the gravity feed leg height in the system is localized in the legs 17 and 18. It should be understood, however, that in its broader aspects this invention is not considered to be limited to this particular arrangement for the relative positioning of the convertor and reconditioner nor to their superposition, nor is it limited to the particular construction of these vessels described hereinabove. Also, while it is preferred to employ steam as the lift gas, it is anticipated that other suitable condensible gases may be substituted therefor. For example, condensible hydrocarbon vapors may be employed as lift gas and recovered from a well at the base of the barometric leg. In some operations the gas supplied to the feed tank and sucked into the lift pipe may be a non-condensible gas in which event the barometric condenser may be replaced by a vacuum pump or other suitable apparatus for evacuating the separator 10.

As an example of the operation of the method and apparatus of this invention its application to a catalytic cracking process using 4–20 mesh (Tyler) bead form synthetic silica alumina catalyst may be considered. In a typical operation the supply hopper 10 is positioned 185 feet above ground level and is maintained under a vacuum of about 7 pounds per square inch. This vacuum is maintained substantially constant by adjustment of the operation of the barometric condenser 130. Air or flue gas may be introduced via pipe 140 into the condenser for this purpose. Catalyst at about 1100° F. passes down through pipes 17 and 18 to the reactor wherein it contacts a reduced crude petroleum charge supplied via pipes 36 and 37. Vaporized gas oil charge is supplied via conduit 41. The upper section of the reactor is maintained under a pressure of about 10 pounds per square inch while the steam pressure in hoppers 19 and 20 is maintained about a half pound higher. The vertical distance between the bottom of hopper 10 and seal hoppers 19 and 20 is about 90 feet. The legs 21 and 22 are only a few feet long. Spent catalyst passes from the convertor to the kiln via legs 49 and 50 which are only about 6 feet long. Catalyst is regenerated in the kiln by contaminant burning and the catalyst temperature is controlled below about 1200° F. by the single set of cooling tubes 95. The catalyst rate of circulation is maintained at about 2.5 to 4.5 parts of catalyst by weight per part of oil charge to the reactor and the total oil charge space velocity is of the order of 1 to 2 volumes of oil per hour measured at 60° F. per volume of catalyst in the reactor. Under these conditions the catalyst may be regenerated without its temperature rising to a heat damaging level by employing cooling tubes at only one or two sections in the lower section of the regeneration kiln. Regenerated catalyst passes as a compact stream from the kiln to lift feed tank 13, the distance between the bottom of the kiln and the top of the lift tank being only about 6 feet. The converter outlet pressure is about 7 pounds per square inch gauge and the pressure in stack 89 may be maintained at about 6 pounds' gauge. If desired, the stack pressure may be permitted to drop to substantially atmospheric but should not be permitted to rise substantially above that in the convertor because this would require an increase in the length of gravity flow legs 49 and 50 and consequently an undesirable increase in the overall height of the entire unit. The pressure within the upper part of tank 13 is substantially atmospheric and that in the lower section of the tank near the entrance to the lift pipe may be controlled anywhere within a range of several pounds vacuum to one or two pounds gauge pressure. The bed depth above the lower end of the lift pipe should be of the order of about 3–8 feet. The level of gas inlets 112 and 113 to feed tank 13 should be preferably within one–two feet of the level of the flared lower end of the lift pipe 14 but less satisfactory operation may still be obtained when the level of secondary gas supply is above the bed surface in the lift feed tank.

It has been found that by employing a suction type gas lift using a condensible lift gas, not only may substantial economies result by virtue of the elimination of the gas compressor required in ordinary pressure lifts but also the total amount of lift gas, for example steam, required to accomplish the contact material lifting is greatly reduced over that required for pressure lift systems. For example, when a vacuum is maintained in the separation zone 10 sufficient to lift the contact material from a feed tank 13 existing at about atmospheric pressure, the lift steam requirements are reduced about one-third over what would be required to lift the same amount of contact material into an atmospheric pressure separation zone from a lift feed zone maintained under sufficient pressure to accomplish the contact material lifting. In general the contact material stream density in the lift pipe should be controlled within the range about 3 to 24 pounds per cubic foot and preferably within the range about 4 to 10 pounds per cubic foot on the basis of a catalyst having a normal packed density of about 45 pounds per cubic foot. The linear gas velocity in the lift pipe should be within the range about 3 to 60 feet per second above the terminal velocity of the catalyst particles. It has been found that while operating within the above ranges a lift pipe having a diameter of about 10 inches (nominal) will handle about 60 tons per hour of catalyst. The total amount of low pressure steam supplied to the lift pipe is of the order of 40 to 50 pounds per minute for the above operation.

It should be understood that the particular details of apparatus design and operation conditions and the particular examples of the application of this invention given hereinabove are intended as illustrative and are not to be construed as limiting the scope of this invention except as it is limited by the following claims.

I claim:

1. An apparatus for the continuous conversion of hydrocarbons in the presence of a cyclically moving granular contact material which comprises: a conversion vessel having a solid material inlet at its upper end and a solid material outlet at its lower end, means to introduce fluid hydrocarbons to said vessel and means to withdraw gasiform products therefrom, a conduit extending vertically through said conversion vessel and fitted tightly at its open upper end through the top of said vessel and fitted tightly at its open lower end through the bottom of said vessel so as to provide a shaft through said vessel open on its ends but out of communication with the interior of said conversion vessel, a regeneration vessel positioned below said conversion vessel, a solid inlet at the upper end of said regeneration vessel and a solid outlet at the lower end thereof, a substantially vertical, short conduit connecting the solid outlet on said conversion vessel and said solid inlet on said regeneration vessel, means to maintain an inert gas atmosphere in the conversion vessel immediately above said conduit, means to admit gas to and means to withdraw gas from said regeneration vessel, a vertical conduit extending through said regeneration vessel having its open upper end fitted tightly through the top of said regeneration vessel and its open lower end fitted tightly through the bottom thereof so as to provide an open, vertical shaft through said regeneration vessel, said last named shaft being vertically in line with the shaft through said conversion vessel, a closed settling chamber positioned a substantial vertical distance above said conversion vessel, a vertical lift conduit extending upward from a location below said regeneration vessel, concentrically through the shafts in said regeneration and conversion vessels and terminating within said settling chamber, said lift conduit being of substantially smaller diameter than said shafts so as to fit loosely through the shafts, whereby binding of the lift conduit within the shafts and stresses arising from thermal expansion are avoided, an outlet conduit connected to said solid material outlet on the lower end of said regeneration vessel, means to introduce the contact material from said outlet conduit into said lift conduit near its lower end, a barometric condenser, means to supply water to said condenser, conduit means connecting said condenser with the upper section of said settling chamber, an elongated vertical conduit connecting the lower section of said settling chamber with the upper section of said conversion chamber, and means to maintain an inert gas atmosphere near the lower end of said conduit, said settling chamber being closed except as aforesaid.

2. An apparatus for the continuous conversion of hydrocarbons comprising in combination: two contacting vessels, spaced closely together one above the other, the lowermost vessel having its bottom only a short distance above the ground, each of said vessels having separate gas inlet and outlet means and solid inlets at their upper ends and solid outlets at their lower ends, a short vertical conduit connecting the solid outlet from the upper vessel with the solid inlet to the lower vessel, means to introduce an inert seal gas into said conduit, a conduit extending vertically through the upper vessel having its open upper end fitted tightly through the top of said upper vessel and its open lower end fitted tightly through the bottom of said upper vessel so as to provide a vertical shaft through the upper vessel open on its ends but out of communication with the interior of the upper vessel, a vertical conduit extending similarly through the lower vessel to provide a similar vertical shaft therethrough which is vertically in line with the shaft through the upper vessel, a settling chamber positioned a substantial vertical distance above said upper vessel, a vertical lift pipe extending upwardly from a location below the lower vessel, concentrically through said vertical shafts and terminating on its upper end within said settling chamber, said lift pipe being of substantially smaller diameter than said shafts so as to fit loosely through the shafts, whereby binding of the lift conduit within the shafts and stresses arising from thermal expansion are avoided, means to admit lift gas to the lower end of said lift conduit, means to pass solid material from the bottom of said lower vessel to a point in said lift conduit near its lower end, means to withdraw lift gas from the upper section of said settling chamber, a vertical conduit extending downwardly from the bottom of said settling chamber into the upper section of said upper contacting vessel, and means to introduce an inert gas to the lower section of said last named conduit.

3. In a continuous process for hydrocarbon conversion wherein a granular contact material is passed cyclically through two contacting zones, one being a conversion zone in which it is brought into contact with a fluid hydrocarbon charge to effect conversion thereof to desired gasiform products and the other zone being a reconditioning zone in which it is brought into contact with a suitable reconditioning fluid to recondition it for reuse in said conversion zone, the improved method of transferring contact material from one of said contacting zones to the other which comprises: flowing contact material at an elevated temperature downwardly from one of said contacting zones as a substantially compact unobstructed stream into a gas lift feed zone located therebelow, effecting suspension of said contact material in a stream of condensible lift gas having a condensation temperature substantially below the elevated contact material temperature in said lift feed zone and transporting the suspended contact material upwardly in said stream to a confined separation zone located above the other of said contacting zones and maintained under sufficient vacuum to suck the contact material and lift gas upwardly from said feed zone, separating the lift gas from the contact material and passing the lift gas to a barometric condensing zone wherein it is mixed with a cool liquid so as to condense the lift gas and thereby draw said vacuum on said separation zone, and flowing the separated contact material from said separation zone to said other of said contacting zones as a substantially compact gravity flowing stream.

4. An improved method for transferring particle-form solids between zones at different elevations which comprises introducing the solids from the lower zone into a stream of condensible carrying gas, the solids being at a temperature above the condensation temperature of the carrying gas sucking the carrying gas and solids upwardly through a confined passage to a confined separation zone which is maintained under sufficient vacuum to effect the transfer of the solids through said lift passage and which is positioned at a level substantially above said lower zone, separating the carrying gas from the particle form solids in said separation zone and passing it from said separation zone to a barometric condensing zone wherein it is mixed with a cool liquid to effect condensation of said carrying gas and thereby maintain said vacuum in said separation zone.

5. An improved apparatus for pneumatic transfer of particle form solids comprising: a confined lift feed chamber, an upright unobstructed pipe connecting into the upper section of said chamber for solid material feed, a settling chamber positioned a substantial distance above said feed chamber, a vertical lift conduit extending upwardly from a level within said feed chamber spaced below its upper end to a level within said settling chamber intermediate its ends, a barometric condenser, means to supply a cooling liquid to said condenser, conduit means connecting said condenser with the upper section of said settling chamber and an outlet conduit for solids extending downwardly from the lower section of said settling chamber.

6. An improved method for transferring granular solids between zones at different elevations which comprises maintaining a substantially compact bed of said solids in a lower confined zone, supplying solids at an elevated temperature onto said bed in a compact unobstructed gravitating stream of granular solids, causing solids at a location within said bed and below its surface to pass into a stream of condensible lift vapor and sucking the lift vapor and solids upwardly through a confined passage into a settling zone positioned at a level substantially above said lower zone and maintained under a substantial vacuum which is sufficient to effect the lifting, said lift vapor having a condensation temperature substantially below the temperature of the solid material lifted, separating the lift vapor from the solids in said settling zone and passing it into a barometric condensing zone wherein it is mixed with a cool liquid so as to be condensed, thereby drawing a vacuum on said settling zone, controlling the amount of vacuum in said settling zone by introducing a non-condensible gas into said barometric condensing zone at a controlled rate and withdrawing the separated solids from the lower section of said settling zone as a compact, gravitating, confined stream.

7. An improved method for transferring granular solid material from a zone at one level to a confined receiving zone at a second level which comprises, maintaining a substantially compact bed of said granular solid material in the lower zone at an elevated temperature and replenishing said bed when needed, sucking the solid material upwardly as a confined elongated lift stream from below the surface of said bed in said zone at the lower level to said confined receiving zone, while supplying a condensible lift gas to said lower zone at a rate controlled to maintain the pressure therein substantially constant, said lift gas having a condensation temperature substantially below the temperature of the solid material the said lift gas being sucked upwardly to said receiving zone with the solid material and serving to maintain the solid material suspended in said confined lift stream, effecting separation of the lift gas from the solid material in said confined receiving zone and passing the lift gas to a condensing zone in which it is mixed with a cooling fluid to condense the lift gas and thereby to maintain said receiving zone under a sufficient vacuum to effect the lifting of the solid material from said lower zone to said receiving zone, removing the cooling liquid and condensed lift gas from said condensing zone through a barometric leg, removing solid material from said receiving zone through an elongated substantially compact stream of restricted cross-section, which stream serves as a seal to prevent loss of the vacuum in said receiving zone.

8. A cyclic process for conversion of hydrocarbons which comprises: passing a granular contact material downwardly through two separate confined contacting zones arranged closely together one above the other in vertical series, the upper zone being a conversion zone and the lower zone being a revivification zone which is positioned only a short distance above the ground level, passing a fluid hydrocarbon charge into contact with said contact material at a pressure substantially above atmospheric and at an elevated conversion temperature to effect conversion of said hydrocarbon charge to a gasiform product, withdrawing said gasiform product from said conversion zone, passing a revivification gas into contact with the contact material in said revivification zone withdrawing the revivification gas from said zone and maintaining the outlet pressure of said gas near atmospheric pressure, flowing contact material at an elevated temperature from said revivification zone downwardly as a short, substantially compact, unobstructed stream onto a substantially vertical compact column of said contact material which is maintained at substantially atmospheric pressure at its upper end, flowing the contact material downwardly in said column a distance within the range about 3 to 8 feet until it reaches a mixing region maintained near atmospheric pressure, suspending the contact material in a stream of carrying gas in said mixing region, sucking the carrying gas and contact material upwardly as a confined stream into a separation zone maintained under a substantial vacuum and positioned a substantial distance above said conversion zone, effecting substantially complete separation of the carrying gas from the contact material in said separation zone, sucking any gaseous material entering said separation zone therefrom so as to maintain said separation zone under substantial vacuum as aforesaid and condensing any condensable constituents in said gaseous material, flowing the separated contact material still at an elevated temperature downwardly as at least one elongated, confined, unobstructed, substantially compact feed leg into the conversion zone, said feed leg being of sufficient vertical height to force the contact material to flow by gravity from the separation zone into the higher pressure conversion zone and introducing a condensible seal fluid into said feed leg adjacent its lower end, said fluid being in the gaseous phase at the elevated contact material temperature.

9. In a cyclic process for catalytic cracking of petroleum fractions, wherein a granular catalyst is passed downwardly as a compact column through a confined conversion zone maintained at a superatmospheric pressure and suitable temperature for effecting catalytic cracking conversion of a petroleum fraction with which the catalyst is contacted in said conversion zone and wherein spent catalyst bearing a carbonaceous contaminant is passed downwardly as a compact stream to and through a confined regeneration zone maintained only a short distance below said conversion zone and having its bottom only shortly above ground level to effect removal of the contaminant by combustion at an elevated temperature, in combination therewith the improved method for transferring the regenerated catalyst from said regeneration zone back to said conversion zone for reuse therein which comprises: withdrawing regenerated catalyst at an elevated temperature very substantially above the condensation temperature of steam from the bottom of said regeneration zone as a substantially compact stream of sufficient length and sufficiently restricted cross-section to prevent substantial escape of regeneration gas from said zone with the catalyst stream, introducing said catalyst into a confined zone maintained directly below said regeneration zone, maintaining said last named zone near atmospheric pressure and under an atmosphere of steam so as to substantially exclude the entry of non-condensible gas thereinto, effecting suspension of said catalyst in a stream of steam in said last named zone, sucking the catalyst and steam stream upwardly through a confined passage extending upwardly through the regeneration and conversion zone and terminating with an enlarged settling zone located a substantial distance above the conversion zone and maintained under a substantial vacuum sufficient to effect the catalyst lifting, effecting separation of catalyst and steam in said settling zone, exhausting the steam from the upper section of said settling zone to a barometric condenser operated to condense said steam and to draw the substantial vacuum in said settling zone, passing separated catalyst still at an elevated temperature well above the condensation temperature of steam from the bottom of said settling zone as a substantially compact gravitating leg to said conversion zone, said leg being of sufficient height to create a catalyst head at its lower end greater than the pressure differential between said settling zone and said conversion zone, and maintaining a steam blanket adjacent the lower end of said leg at a pressure above that in the conversion zone immediately therebelow so as to prevent escape of hydrocarbons from said conversion zone to said settling zone.

10. In a cyclic conversion system involving two contacting vessels adapted for contacting a moving bed of granular catalyst with fluid reactants at elevated temperatures, which vessels are arranged one above the other and are in catalyst flow communication through a conduit extending between the lower section of the upper vessel and the upper section of the lower vessel the improved apparatus for transferring granular material from the lower section of the lower contacting vessel to the upper section of the upper contacting vessel which comprises: a closed supply hopper positioned a substantial distance above the upper contacting vessel, a vertical pipe connecting the lower section of said hopper with the solid material inlet on the upper contacting vessel, a barometric condenser having a water inlet and a barometric leg, a conduit connected between the upper section of said supply hopper and said barometric condenser, means to withdraw gas from the upper section of said barometric condenser, a separate gas inlet to said barometric condenser, a flow control valve on said inlet, a control device adapted to control the opening of said valve responsive to pressure changes in said supply hopper, a lift pipe extending upwardly from a location below the lower contacting vessel to a location within said supply hopper intermediate its ends, means to pass solid material from the bottom of said lower contacting vessel to the lower end of said lift pipe and means to admit steam to the lower end of said lift pipe.

11. In a system for continuous conversion of hydrocarbons having a conversion vessel and a regeneration vessel positioned one above the other and adapted for contacting gaseous reactants with a moving bed of contact material, and having a communicating passageway extending downwardly from the conversion vessel to the regeneration vessel for flow of granular contact material therebetween, the improved apparatus for transfer of the granular contact material from the lower regeneration vessel back to the upper conversion vessel which comprises, a settling chamber positioned a substantial distance above said conversion chamber, an upright lift conduit extending upwardly from a location below said regeneration vessel to a location within said settling chamber, members defining a continuous, unobstructed passage for solid material flow from the lower section of said regeneration vessel to a location directly communicating the lower end of said lift conduit, conduit means for steam admission into the lower end of said lift conduit, a barometric condenser, means to supply water to said condenser, conduit means connecting said condenser with the upper section of said settling chamber, an elongated vertical conduit connecting the lower section of said settling chamber with the upper section of said conversion chamber, and means to maintain an inert gas atmosphere near the lower end of said conduit.

12. In a cyclic process for the conversion of hydrocarbons wherein a granular contact material passes downwardly through two separate confined contacting zones arranged one above the other, the upper one being a conversion zone in which it is contacted with a fluid hydrocarbon charge to effect the conversion thereof and the lower one being a reconditioning zone wherein it is contacted with a suitable gas to recondition it for reuse in said conversion zone, the improvement which comprises, passing the contact material through said reconditioning zone as a substantially compact bed and supplying an oxygen containing gas to said zone at a pressure suitable to force the gas downwardly through at least a lower portion of said bed and withdrawing the gas from said bed at substantially atmospheric pressure, flowing the contact material downwardly from the bottom of said regeneration zone as at least one short substantially compact unobstructed continuous stream to a zone a short distance below said regeneration zone and maintained at substantially atmospheric pressure, causing the contact material to become suspended in a low pressure stream of lift gas in said last named zone, sucking the lift gas and suspended contact material upwardly as a confined stream into a separation zone maintained under a substantial vacuum and positioned a substantial distance above said conversion zone, effecting substantially complete separation of the carrying gas from the contact material in said separation zone, exhausting the separated gas from said separation zone to maintain said zone under substantial vacuum, flowing the contact material from the bottom of said separation zone downwardly as at least one elongated, confined, unobstructed, substantially compact feed leg into the uppermost contacting zone, said feed leg being of sufficient vertical height to create a head of contact material at its lower end which is greater than the pressure differential between said conversion and separation zones.

13. In a cyclic process for conversion of hydrocarbons wherein a granular contact material passes as a substantially compact column downwardly through two contacting zones arranged one above the other and communicating through a restricted confined passage, the upper one of said zones being a conversion zone in which it is contacted with a fluid hydrocarbon charge to effect the conversion thereof and the lower one being a reconditioning zone located only a short distance above ground level wherein it is contacted with a suitable gas to recondition it for reuse in said conversion zone the improvement comprising, supplying an oxygen containing gas into said regeneration zone at an intermediate level along its length and passing it in part downwardly and in part upwardly through said bed to effect the reconditioning, withdrawing the gas from the upper and lower sections of said bed through outlets maintained substantially at atmospheric pressure, flowing the contact material downwardly from the bottom of said regeneration zone as a substantially compact continuous, unobstructed stream having a short length of the order of about 6 feet and delivering said stream onto a confined bed of said confined material near ground level which is maintained at substantially atmospheric pressure, causing the contact material at a location substantially below the surface of said bed to enter a stream of carrying gas and become suspended therein, sucking the carrying gas and contact material upwardly as a confined stream into a separation zone maintained under a substantial vacuum and positioned a substantial distance above said conversion zone, effecting substantially complete separation of the carrying gas from the contact material in said separation zone, exhausting the separated gas from said separation zone to maintain said zone under substantial vacuum, and flowing the contact material from the bottom of said separation zone downwardly as at least one elongated, confined, unobstructed, substantially compact feed leg into the uppermost contacting zone.

14. In a cyclic process for conversion of hydrocarbons to lower boiling products wherein a granular contact material is passed downwardly through two contacting zones arranged in vertical series, in which zones the contact material flows as a substantially compact column and between which zones it flows as a confined unobstructed compact stream of relatively small cross-sectional area, the upper one of said contacting zones being a reaction zone in which the contact material contacts a fluid hydrocarbon reactant under superatmospheric pressure and at a suitable temperature to effect conversion thereof to lower boiling products and the other zone being a reconditioning zone in which the contact material is contacted with a suitable reconditioning gas under superatmospheric pressure and at a temperature level suitable for effecting reconditioning of the contact material for reuse in the reaction zone and wherein a steam seal is maintained adjacent the upper and lower ends of said reaction zone in combination with said cyclic conversion process the improved method for circulating contact material from the lower to the upper of said contacting zones which comprises, passing contact material at an elevated temperature substantially above the condensation temperature of steam from the lower of said contacting zones as a substantially compact unobstructed stream to a depressuring zone where the stream is vented to the atmosphere, flowing contact material from said depressuring zone as a compact unobstructed gravitating stream onto the surface of a substantially compact bed of said contact material in a confined lift feeding zone, causing contact material at a location within said bed below its surface and above its bottom to pass into a stream of lift steam and sucking the lift steam and contact material upwardly as a confined stream into a settling zone positioned above the upper contacting zone and maintained under a substantial vacuum which is sufficient to effect the lifting, separating the lift steam from the contact material in said settling zone and sucking it into a barometric condensing zone operated to effect condensation of the steam and to maintain the vacuum in said settling zone, permitting replacement steam to enter the lower end of said lift stream, flowing the contact material still at an elevated temperature from said settling zone as a compact unobstructed gravitating feed leg into the conversion zone against the pressure therein, and controlling the rate of downward flow of contact material from said settling zone to and through the contacting zones and down to said bed in said lift feeding zone by adjusting the rate of contact material introduction from within said bed in said lift feeding zone to said lift steam stream.

15. A continuous cyclic process for hydrocarbon conversion which comprises in combination, passing a granular contact material at an elevated temperature suitable for effecting hydrocarbon conversion cyclically through two contacting zones, one being a conversion zone in which it is brought into contact with a fluid hydrocarbon charge to effect conversion thereof to the desired gasiform products and the other zone being a reconditioning zone in which it is brought into contact with a suitable reconditioning fluid to recondition it for reuse in said conversion zone, withdrawing the contact material at an elevated temperature from the bottom of said reconditioning zone and flowing it downwardly as at least one short substantially compact unobstructed continuous stream to a mixing region a short distance below said reconditioning zone which is maintained near atmospheric pressure, maintaining the pressure adjacent the upper end of said compact stream substantially at atmospheric pressure, causing said contact material to enter a suspending stream of a suitable lift fluid which is in gaseous phase at the elevated temperature of said contact material, sucking the lift gas and suspended contact material upwardly as a confined stream into a separation zone positioned above the conversion zone, separating the contact material from the lift gas and sucking all gaseous material from said separation zone so as to maintain said separation zone under a vacuum sufficient to effect the lifting of the contact material as aforesaid and condensing any normally condensable constituents in said gaseous material, flowing the separated contact material at an elevated temperature from said separation zone downwardly by gravity as a substantially compact unobstructed feed stream into said conversion zone, which is maintained under a substantially higher pressure than said separation zone and introducing a suitable inert seal fluid which is in the gaseous phase at the elevated temperature of the contact material into said feed stream near its lower end.

References Cited in the file of this patent

UNITED STATES PATENTS

| Number | Name | Date |
|---|---|---|
| 168,029 | Korting | Sept. 21, 1875 |
| 692,106 | Bedarrides | Jan. 28, 1902 |
| 727,030 | Tilghman | May 5, 1903 |
| 1,280,780 | Lob | Oct. 8, 1918 |
| 2,331,433 | Simpson et al. | Oct. 12, 1943 |
| 2,438,261 | Utterback | Mar. 23, 1948 |
| 2,440,475 | Jacomini | Apr. 27, 1948 |
| 2,509,983 | Morrow | May 30, 1950 |
| 2,561,409 | Ardern | July 24, 1951 |
| 2,561,771 | Ardern | July 24, 1951 |
| 2,624,695 | Ivey et al. | Jan. 6, 1953 |

OTHER REFERENCES

Walker et al.: "Principles of Chemical Engineering," 3d ed., 1937, pages 383 to 385.

"Petroleum Refiner," vol. 28, No. 1, pages 110 to 112, January 1949.